US012767613B2

(12) United States Patent
Aqel

(10) Patent No.: US 12,767,613 B2
(45) Date of Patent: Oct. 20, 2026

(54) INTEGRATED PROCESS TO UPGRADE LOW-GRADE CALCAREOUS PHOSPHATE ORE WITH LOW CO2 EMISSIONS AND LOW PHOSPHOGYPSUM WASTE

(71) Applicant: Saudi Arabian Mining Company (Ma'aden), Riyadh (SA)

(72) Inventor: Malik Mohammad Odeh Aqel, Amman (JO)

(73) Assignee: Saudi Arabian Mining Company (Ma'aden), Riyadh (SA)

( * ) Notice: Subject to any disclaimer, the term of this patent is extended or adjusted under 35 U.S.C. 154(b) by 1079 days.

(21) Appl. No.: 17/728,257

(22) Filed: Apr. 25, 2022

(65) Prior Publication Data

US 2023/0322637 A1 Oct. 12, 2023

(30) Foreign Application Priority Data

Mar. 25, 2022 (CA) ................................ CA 3153419

(51) Int. Cl.
*C05B 11/06* (2006.01)
*C05B 11/02* (2006.01)
*C05B 11/08* (2006.01)

(52) U.S. Cl.
CPC .............. *C05B 11/06* (2013.01); *C05B 11/02* (2013.01); *C05B 11/08* (2013.01)

(58) Field of Classification Search
None
See application file for complete search history.

(56) References Cited

U.S. PATENT DOCUMENTS

| | | |
|---|---|---|
| 4,073,635 A | 2/1978 | Suppanen |
| 4,323,386 A | 4/1982 | Heggebo |
| 4,425,229 A | 1/1984 | Baron |
| 7,378,070 B2 | 5/2008 | Megy |
| 8,425,872 B2 | 4/2013 | Takhim |

FOREIGN PATENT DOCUMENTS

| | | | | | |
|---|---|---|---|---|---|
| BR | 112020002477 | A2 | | 7/2020 | |
| CA | 2773080 | C | | 5/2014 | |
| CN | 102126738 | A | | 7/2011 | |
| CN | 103318863 | | * | 9/2013 | |
| CN | 110394239 | A | | 11/2019 | |
| EP | 2186774 | | * | 10/2009 | |
| EP | 2186774 | A1 | * | 5/2010 | ........... C01B 25/237 |
| ES | 2207565 | T3 | | 6/2004 | |
| ES | 2809737 | T3 | | 3/2021 | |
| IL | 272456 | | * | 3/2020 | |
| WO | WO-2021072551 | A1 | * | 4/2021 | ............... C05G 5/12 |

OTHER PUBLICATIONS

W.M. Swift, "Decomposition of Calcium Sulfate: A Review of Literature", Journal, 1976, 1-64, U.S. Energy Research and Development Administration.

Zhen-Shan Li, "Effect of Temperature on the Carbonation Reaction of CaO with CO2", Article, 2012, 2473-2482, Energy & Fuels.

* cited by examiner

*Primary Examiner* — Sheng H Davis
(74) *Attorney, Agent, or Firm* — Hayes Soloway PC

(57) ABSTRACT

A new integrated method based on upgrading low-grade calcareous phosphate ore with low $CO_2$ emissions and low phosphogypsum waste production is disclosed. The method is an alternative integrated method that increases $P_2O_5$ recovery, reduces costs, minimizes the environmental impact of product phosphogypsum and $CO_2$, and overcomes limitations due to different impurities that have negatively affected the yield of traditional processes to a wide range of natural phosphate sources.

14 Claims, 1 Drawing Sheet

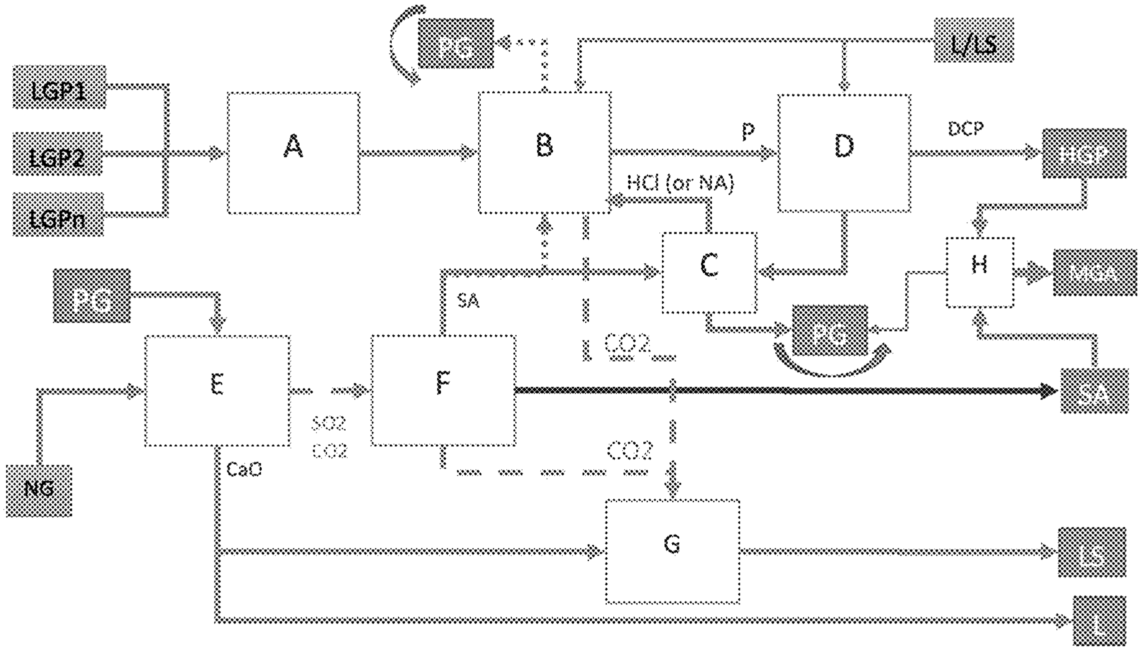
PG
L/LS
LGP1
LGP2
LGPn
A
B
P
D
DCP
HGP
HCl (or NA)
C
H
MGA
PG
SA
PG
E
F
CO2
SA
SO2
CO2
CO2
NG
CaO
G
LS
L

INTEGRATED PROCESS TO UPGRADE LOW-GRADE CALCAREOUS PHOSPHATE ORE WITH LOW CO2 EMISSIONS AND LOW PHOSPHOGYPSUM WASTE

CROSS-REFERENCE TO RELATED APPLICATIONS AND PRIORITY

This patent application claims priority from Canadian Patent Application No. 3,153,419 filed Mar. 25, 2022. This patent applications is herein incorporated by reference in its entirety.

TECHNICAL FIELD

The present invention relates to a new integrated process to upgrade low-grade calcareous phosphate ore with low $CO_2$ emissions and low phosphogypsum waste.

BACKGROUND OF THE INVENTION

Traditional approaches for upgrading low-grade calcareous phosphate ores involve a number of strategies, including rejecting in the mine and avoiding processing, using it for direct application due to its high reactivity, applying low efficiency beneficiation with high reject ratio, and targeting to develop small-scale operation with high end value products.

Key traditional technologies for handling low-grade calcareous phosphate ore, as exemplified in patents Pat. No. U.S. Pat. No. 8,425,872, Pat. No. EP 2186774, Pat. No. ES 2809737, Pat. ES No. 2809737, and Pat. No. BR 112020002477, typically include: chemical acid digestion of the low-grade phosphate feedstock in diluted conditions to produce high value products such as animal feed phosphate (di-calcium phosphate) and technical grade phosphoric acid (TGPA). Even though high phosphorous pentoxide ($P_2O_5$) recovery can be achieved, these technologies have limited scale of application being restricted as they are by the excessive digestion acid, and excessive lime or limestone (LS) amounts required to neutralize the diluted digestion solution. Another traditional approach features thermal processing of the low-grade calcareous phosphate ore to produce yellow phosphorus or $P_2O_5$ vapor (usually present as the dimer $P_4O_{10}$ in the gas phase), which is in turn converted into TGPA. This thermal processing method is well-established in the art, with some new developments such as the "Improved Hard Process" by JDC having shown promising results, as disclosed in Pat. No. U.S. Pat. No. 7,378,070. These technologies are energy intensive and require additional additives like pet-coke or iron ore, combined with limited unit capacity. Another traditional approach is based on the calcination of the low-grade calcareous phosphate ore combined with dry or wet slacking. This process has been practiced historically, and even though it is scalable, is characterized by a low recovery ratio and significant reduction on concentrate's reactivity, which requires high reaction volumes in phosphoric acid plants (PAP), thus reducing PAP capacity by more than 50%. Improvement in unit operation uses, like flash calciners could improve the reactivity part, but it still has low $P_2O_5$ recovery. An improved flotation process for the low-grade calcareous phosphate ore is disclosed in Pat. No. CN 110394239A and Pat. No. U.S. Pat. No. 4,425,229. Limitation in the separation and recovery of $P_2O_5$ negatively affected efficiency in actual industrial applications and the process was not able to reach required commercial phosphate concentrations at low costs. Also, it is dependent on reagents which are challenging to procure in remote mining locations. In addition, nitric acid (NA) digestion of phosphate and PG precipitation by addition of sulfuric acid (SA), production of di-calcium phosphate, and processing of high MgO phosphate ores in nitro-phosphate process have been demonstrated clearly in previous art and establish industrially, as disclosed in Pat. No. U.S. Pat. No. 4,073,635, ES 2207565, CN 102126738, and U.S. Pat. No. 4,323,386;

Traditional key technologies related to calcination of phosphogypsum (PG) and formation of LS, include phosphogypsum calcination into calcium oxide (CaO) and sulfur dioxide ($SO_2$) is well established [1, 2].

Additionally, $CO_2$ capturing with CaO in flue gases to produce byproduct limestone is disclosed in Pat. No. CA 2773080.

Typical ore feedstocks are low-grade in $P_2O_5$ content and have significant undesirable impurities of dolomite and LS. These ores are normally upgraded to higher concentrated phosphate rock (CPR) by the application of physical beneficiation processes, which later is further digested with large amount of sulfuric acid to produce phosphoric acid (PA). These setups operate with less than 65% total recovery. This low recovery rate is due to a number of losses at different stages in the process, where the $P_2O_5$ is lost in the form of: (1) low-grade phosphate rejects, (2) during beneficiation and (3) during PA production with $P_2O_5$ losses in phosphogypsum, that is produced in large quantities.

Also, the CPR still has high residues of dolomite and limestone, with concomitant limiting effects in both cost and capacity limitation, which impact on both ore beneficiation and on the PAP operations. Such negative effects are typically manifested in the form of: (1) high consumption of reagents and low recovery in beneficiation; (2) unrecoverable additional cost due to increased sulfuric acid consumption in PAP (3.4-3.8 ton sulfuric acid per ton of $P_2O_5$); (3) increased phosphogypsum production in range (6-8 tons of phosphogypsum per ton of $P_2O_5$), which limits capacity on the PAP filters; and (4) $CO_2$ emissions from dolomite and LS during digestion in acid.

Phosphate operation may lose valuable $P_2O_5$ in four ways: (1) excluding very low-grade and high impurity reserves; (2) use of high cutoff grade percent that targets 14-16% $P_2O_5$, to avoid average low-grade (<17% $P_2O_5$) run of mine (ROM), which leads to leaving considerable $P_2O_5$ amounts in the mines; (3) production of high quantity of lime and low-grade phosphate rejects during beneficiation; (4) $P_2O_5$ losses in PAP due to high phosphogypsum production.

The foregoing issues signal the need for a method that overcomes the limitations of traditional processes and avoids restrictions in applicability to multiple raw material while providing cost advantages.

SUMMARY OF THE EMBODIMENTS

The present invention provides an alternative integrated method that increases $P_2O_5$ recovery, reduces costs, minimizes the environmental impact of product phosphogypsum and $CO_2$, and overcomes limitations due to different impurities that have negatively affected the applicability of traditional processes to a number of natural phosphate sources. In certain aspects, the invention of the present disclosure proposes to substitute the physical beneficiation with an alternative integrated chemical process that is estimated to increase the accessible $P_2O_5$ resources by 200-400%.

In one aspect, the invention is directed to a novel integrated process to upgrade low-grade calcareous phosphate ore while generate low $CO_2$ emissions and low phosphogypsum waste during the process.

Accordingly, in certain embodiments, disclosed herein is a method featuring the digestion of low-grade calcareous phosphate ore with suitable acid like sulfuric acid and nitric acid or hydrochloric acid (HCl), and mixtures of the SA with either NA or HCl, in diluted conditions to separate impurities such as: (1) calcium in the form of calcium sulfate, calcium nitrate or calcium chloride, (2) magnesium/aluminum/iron in the form of phosphates or hydroxides (3) fluorides in the form of calcium fluoride. Diluted conditions are well known and are described in Pat. No. U.S. Pat. No. 8,425,872, Pat. No. EP 2186774, Pat. No. ES 2809737, Pat. No. ES 2809737, and Pat. No. BR 112020002477, Pat. No. U.S. Pat. No. 4,073,635, Pat. No. ES 2207565, Pat. No. CN 102126738, and Pat. No. U.S. Pat. No. 4,323,386. This is followed by the precipitation and isolation of $P_2O_5$ in the form of fertilizer-grade di-calcium phosphate (DCP) by precipitation.

In certain embodiments, the integrated process includes the calcination of phosphogypsum to produce lime (CaO) and sulfur dioxide ($SO_2$). The calcination of phosphogypsum is used for SA production. The sulfur/sulfuric acid circular recovery from phosphogypsum, which is produced during the production of DCP, typically requires a minimum makeup of sulfur in the range of 10-30%.

In certain embodiments, the integrated method includes capturing $CO_2$ from fuel and the digested LS in the ore, to achieve $CO_2$ emission neutrality and substantially pure limestone, with significant heat recovery from the reaction of $CO_2$ and lime (CaO) produced from the calcination step, thereby achieving sustainable operations. The recycling of CaO and/or limestone is used to produce DCP and to separate impurities during the different neutralization stages of the diluted acidic digestion solution. This step allows for doing away with outsourcing and overcomes critical reactivity issues.

In certain embodiments, the integrated method regenerates sulfuric acid and avoids accumulation of waste phosphogypsum during the phosphate processing to produce fertilizer grade DCP.

In certain embodiments, the integrated method converts low-grade phosphate (LGP) into high grade phosphate (HGP) that can be used for phosphoric acid production on conventional PAPs with 60-75% less sulfuric acid consumption, and about 200 to 300% of the nominal capacity achieved with conventional phosphates concentrate feeds.

In certain embodiments, the integrated method allows for the recovery of low-grade phosphates on a cost-effective basis with recovery of $P_2O_5$ in the range of 80-90% as compared to conventional beneficiation and phosphate processing.

In certain embodiments, the integrated process makes available many low-quality phosphate reserves that have hitherto been rejected due to low $P_2O_5$ content or high contents of impurities such as silica, limestone, dolomite and clay.

In certain embodiments, the integrated method utilizes calcium in the phosphate ore to capture $CO_2$ and fixes it in the form of limestone on a permanent basis

BRIEF DESCRIPTION OF THE FIGURES

The invention can be better understood with reference to the following FIGURE and description.

FIG. 1 illustrates Block Diagram 1: Integrated concept for LGP processing to produce HGP above approximately 45% $P_2O_5$, and SA/PG recycle with $CO_2$ capturing.

DETAILED DESCRIPTION OF SPECIFIC EMBODIMENTS

The present invention describes a novel integrated method that utilize proven process technologies to chemically process low-grade calcareous phosphate ore or phosphate waste from existing beneficiation operation.

In some embodiments, the present invention describes an integrated method to produce high grade phosphate (HGP) with $P_2O_5$ above 42%. Unless stated otherwise, component percentages are given in weight percent (wt %). The method can be better understood with reference to FIG. 1.

In certain embodiment of the present disclosure, a method is disclosed, with reference to FIG. 1, in which low-grade phosphate sources (LGP, LPG2, . . . LPGn) can be mixed, crushed, grinded and conditioned in block A.

In other embodiments, the low-grade calcareous phosphate ore is partially digested as part of the processing steps of block B with an acidic solution, comprising sulfuric acid and nitric acid or hydrochloric acid, or mixtures of the SA with either NA or HCl, where the concentration of $P_2O_5$ in solution is in a range of 2-10% by weight, to obtain a solution comprising monocalcium phosphate in the form of $Ca^{2+}$ and $H_2PO_4^{-1}$ ions. The phosphate ion in the solution may be in the form of acids and salts, for example $H_3PO_4$ and $H_2PO_4^-$.

In a preferred embodiment, the concentration of $P_2O_5$ in solution is approximately 6% by weight.

In other embodiments, impurities comprising silica, fluorides, magnesium, aluminum, iron, heavy metals, and excess calcium are partially precipitated and separated in the steps of block B.

In a preferred embodiment, di-calcium phosphate is precipitated from diluted monocalcium phosphate solutions by adding an alkalinizing agent comprising $Ca^{2+}$ at a temperature above approximately 80° C. to obtain anhydrous forms of di-calcium phosphate:

This reaction can be illustrated as follows:

$$Ca(H_2PO_4)_2+CaO{=\!=}2CaHPO_4+H_2O \quad (i)$$

In other embodiments, anhydrous di-calcium phosphate is formed by the precipitation from diluted monocalcium phosphate solution at a temperature in approximately the range of 80-100° C.

In a preferred embodiment, di-calcium Phosphate is precipitated from diluted monocalcium phosphate solutions by adding an alkalinizing agent selected from the group consisting of a CaO and $CaCO_3$, for example from a source comprising lime or limestone.

In other embodiments, byproduct phosphogypsum is produced from the reactions described in block B:

$$CaCO_3+H_2SO_4=CaSO_4+H_2O+CO_2 \quad (i)$$

$$Ca_3(PO_4)_2+2H_2SO_4{=\!=}2CaSO_4+Ca(H_2PO_4)_2 \quad (ii)$$

In other embodiments, phosphogypsum waste constitute of mainly $CaSO_4$ with other impurities like; Silica, CaF2, Ca(H2PO4)2, CaHPO4 and (Al,Fe)2(HPO4)3. CaSO4 is produced from the reactions described in block B.

In preferred embodiments, byproduct phosphogypsum is precipitated following from the reactions described in block C:

$$CaCl_2+H_2SO_4=CaSO_4+2HCl, \quad (iii)$$

$$Ca(NO_3)_2+H_2SO_4=CaSO_4+2HNO_3 \quad (iv)$$

In other embodiments, phosphogypsum waste constitute of mainly $CaSO_4$, which is produced by reactions (iii) and (iv) in block C.

In preferred embodiments, diluted acids selected from the group consisting of $HNO_3$ or HCl, from the reactions that occur in block C, are recycled after reaction with sulfuric acid and separation from $CaSO_4$, as described in the following reactions (iii) and (iv):

$$CaCl_2+H2SO4=CaSO4+2HCl, \quad (iii)$$

$$Ca(NO3)2+H2SO4=CaSO_4+2HNO_3 \quad (iv)$$

In a further preferred embodiment, the recycled HCl or $HNO_3$ from block C is utilized in block B. In other embodiments, the phosphogypsum ($CaSO_4$) separated, washed and neutralized from the reactions comprising (A) $CaCO_3+H_2SO_4=CaSO_4+H_2O+CO_2$, (B) $Ca_3(PO_4)_2+2H_2SO_4=2CaSO_4+Ca(H_2PO_4)_2$, (C) $CaCl_2+H_2SO_4=CaSO_4+2HCl$, (D) $Ca(NO_3)_2+H_2SO_4=CaSO_4+2HNO_3$, (E) $CaHPO_4+H_2SO_4=CaSO_4+H_3PO_4$, from blocks B, C, and H is calcinated in block E at a temperature range of 1000-1700° C. to produce CaO and $SO_2$ and $CO_2$ according to the reaction (v):

$$4CaSO_4\cdot 2H_2O+CH_4+Heat=4CaO+4SO_2+CO_2+10H_2O \quad (v)$$

In preferred embodiments, the phosphogypsum ($CaSO_4$) that is separated, washed and neutralized from reactions (A) to (E) from blocks B, C, and H is calcinated in block E at a temperature range of 1200-1500° C.

In certain embodiments, sulfuric acid is recovered in an $SO_2$ gas-based sulfuric acid plant (block F) by integrating the phosphogypsum ($CaSO_4$) calcination occurring in block E as described in reaction (vi):

$$4SO_{2+4}H_2O=4H_2SO_4 \quad (vi)$$

In other preferred embodiments, the sulfuric acid recovered in the $SO_2$ gas-based sulfuric acid plant (block F) is utilized in blocks B or C, and H.

In preferred embodiments, HGP or DCP produced in block D is washed and dried then used to produce Merchant Grade Phosphoric Acid in block H as described in reaction (vii):

$$CaHPO_4+H_2SO_4=CaSO_4+H_3PO_4 \quad (vii)$$

In preferred embodiments, captured CO2 that is produced in blocks B and F is reacted with CaO produced in block E to produce CaCO3 (limestone) in a fluid bed reactor in block G, as described in reaction (viii);

$$CO_2+CaO=CaCO_3 \quad (viii)$$

In other embodiments, the integrated method of the present invention describes the digestion of low-grade calcareous phosphate ore with suitable acid like; sulfuric acid, nitric acid or hydrochloric acid on diluted conditions to separate impurities comprising: (1) calcium in the form of calcium sulfate, calcium nitrate or calcium chloride, (2) magnesium/aluminum/Iron in the form of phosphates of hydroxides (3) fluorides in the form of calcium fluoride. The $P_2O_5$ is then isolated by precipitation in the form of fertilizer-grade di-calcium phosphate (DCP).

In another embodiment, the integrated method of the present invention describes the novel integration is targeting the production of fertilizer-grade di-calcium phosphate (DCP) with phosphate ($P_2O_5$) concentration above 42%, starting from low-grade ore or beneficiation waste having $P_2O_5$ as low as 10%.

In another embodiment, the integrated method of the present invention describes the calcination of phosphogypsum to produce lime (CaO) and sulfur dioxide ($SO_2$), which will subsequently be used for sulfuric acid production. The sulfur/sulfuric acid circular recovery from phosphogypsum produced during the production of DCP, will require minimum makeup of sulfur in the range of 10-30%.

In another embodiment, the integrated method of the present invention describes the $CO_2$ capturing from fuel and the digested limestone in the ore, to achieve $CO_2$ emission neutrality. Relatively pure limestone with significant heat recovery from the reaction of $CO_2$ and Lime (CaO) produced from the calcination step, to result in sustainable operations.

In another embodiment, the integrated method of the present invention is drawn to the recycling of CaO and/or limestone, which will also be reused to produce DCP and separate impurities during the different neutralization stages of the diluted acidic digestion solution. This will save the outsourcing of both into the process and overcome the critical reactivity issues faced by traditional methods and applications.

In another embodiments, the novel integrated method of the present invention avoids multiple raw material restrictions and provides cost advantages that comprise: (a) using calcium in the phosphate ore to capture $CO_2$ and fix it in limestone on a permanent basis; (b) regenerating sulfuric acid and avoiding accumulation of waste phosphogypsum during the phosphate processing to produce fertilizer grade di-calcium phosphate (DCP); (c) converting low grade material into high grade materials that can be used for phosphoric acid production on conventional plants with 60-75% less sulfuric acid consumption, and 200-300% of the nominal capacity of phosphoric acid plants compared to conventional phosphates concentrate feeds; (d) allowing the recovery of low grade phosphates on an economical basis with recovery of $P_2O_5$ in the range of 80-90% compare to current conventional beneficiation and phosphate processing; and (e) making available for processing and recovering $P_2O_5$ from many low quality phosphate reserves that have been rejected due to low $P_2O_5$ content or high impurities content comprising silica, limestone, dolomite and clay.

Material and Methods

In an exemplary embodiment, the integrated method with reference to FIG. 1, targets the production of high grade phosphate (HGP) or fertilizer-grade di-calcium phosphate (DCP) with phosphate ($P_2O_5$) concentration above 45% by weight, starting from low-grade ore or beneficiation waste, identified as low-grade phosphate sources (LPG1, LGP2, .... LGPn) having $P_2O_5$ contents as low as 10% and typically mixture of LGPs in the range of 6-26% by weight.

The composition of phosphate ores in general can be represented as follows:

$$n[Ca_3(PO_4)_2],0.5n[CaF_2]\cdot m[CaCO_3]\cdot x[MgCO_3,Mg_2(PO_4)_3]\cdot y[(Al,Fe)PO_4]\cdot z[SiO_2]$$

where:

$Ca_3(PO_4)_2$ is referred to as tri-calcium phosphate (TCP) associated in sedimentary phosphate with $CaF_2$, but alternatively $CaCO_3$ can substitute $CaF_2$ in the formula. The value of "n" can be equal to 10 to illustrate the impurities in LGP as further described below;

$CaCO_3$ is the limestone associated with the phosphate ore or part of the surrounding material above or below the phosphate ore layer. The higher the "m" the lower the grade of the phosphate ore is considered, "m" values >30 are considered LGP;

$MgCO_3$ is usually associated with $CaCO_3$ in the form of dolomite and can be part of the surrounding material above or below the phosphate ore layer. The higher the "x" the more Mg contamination and the lower the grade of the phosphate ore is considered, "x" values >2.0 are considered LGP;

$(Al,Fe)PO_4$ are normally associated with the phosphate ore, but Al and Fe can be found in clay layers mixed or surrounding the phosphate ore layers. The higher the "y" the lower the grade of the phosphate ore is considered, "y" values >4.0 are considered LGP;

$SiO_2$ usually in the form of quarts or sand and can be mixed or surrounding the phosphate ore. The higher the "z" the lower the grade of phosphate ore is considered, "z" values >15 are considered LGP.

In block B, LGP is partially digested with an acid, comprising sulfuric acid and nitric acid or hydrochloric acid in a diluted condition, where $P_2O_5$ is in the range of 2-10% in solution, and preferably is 6%.

The technologies (Patents; 1, 2, 3, 4, 5, 11 and 12) are well established in this area which produce mono-calcium phosphate (MCP) in soluble form and allow the dissolving of typical impurities like; fluorides, magnesium, aluminum, Iron and excess calcium. Insoluble impurities like; $SiO_2$, $CaF_2$ and $CaSO_4$, are the first to be separated after digestion.

To illustrate the digestion reactions to produce soluble MCP ($Ca(H_2PO_4)_2$), depending on the acid used, are as follow:

$$2nH2SO_4+nCa_3(PO_4)_2=nCa(H_2PO_4)_2+2nCaSO_4 \quad (ix)$$

$$4nHNO_3+nCa_3(PO_4)_2=nCa(H_2PO_4)_2+2nCa(NO_3)_2 \quad (x)$$

$$4nHCl+nCa_3(PO_4)_2=nCa(H_2PO_4)_2+2nCaCl_2 \quad (xi)$$

However, the excessive use of acid is mainly related to $CaCO_3$, and other cations like Mg, Al and Fe.

These reactions can be illustrated as follows:

$$mH_2SO_4+mCaCO_3=mCaSO_4 \quad (xii)$$

$$2mHNO_3+mCaCO_3=2mCa(NO_3)_2 \quad (xiii)$$

$$2mHCl+mCaCO_3=2mCaCl_2 \quad (xiv)$$

For LGP an "m/n" ration of 3 or 4, it will require an excess acid of more than 150% or 200% respectively.

The excessive-acid-use limits the application of this technology on LGP that is overcome by the present invention. The choice of acid to be used depends on the key impurities that exist in LGP as disclosed in Pat. No. U.S. Pat. No. 8,425,872, Pat. No. EP 2186774, Pat. No. ES 2809737, Pat. No. ES 2809737, Pat. No. BR 112020002477, CN 102126738, and U.S. Pat. No. 4,323,386.

In block D, di-calcium phosphate (DCP) is precipitated from diluted MCP solution by neutralization using CaO source like lime or limestone. The method is well known in the industry. Di-hydrated DCP ($CaHPO_4 \cdot 2H_2O$) is conventionally produced at low temperatures, below 70° C., with $P_2O_5$ content below 42%. The present invention utilizes temperatures above 80° C. to ensure the production of anhydrous DCP ($CaHPO_4 \cdot 0H_2O$) to achieve $P_2O_5$ levels above 42%, which is referred to as high grade phosphate (HGP).

SA can be recycled directly in block B or indirectly to regenerate other acids like NA or HCl in block C, with phosphogypsum precipitation and separation.

Described herein are the regeneration reactions that occur in block C:

$$CaCl2+H2SO4=CaSO4+2HCl, \quad (iii)$$

$$Ca(NO3)2+H2SO4=CaSO_4+2HNO_3 \quad (iv)$$

In the present invention, phosphogypsum is produced in blocks B or C and H, separated, washed and neutralized with lime. The washed phosphogypsum is calcined and minimum phosphogypsum waste material is expected from this integrated process setup.

Lime or limestone are recycled in blocks B and D to carry out the neutralization of the acidic digestion solution to separate DCP in the form of HGP.

The $CO_2$ released from LGP digestion in block B, and $CO_2$ produced from fuel combustion in block E are made to react with CaO, with byproduct lime to capture $CO_2$ in the form of limestone, as shown in block G. This allows both heat recovery and environmentally sustainable operation, considering the high level of $CO_2$ emissions in blocks B and E.

Described herein is the reaction:

$$CaO+CO_2=CaCO_3+\text{heat (temperature range: 400-600° C.)} \quad (xvi)$$

The use of lime or LS is an additional issue with previous art due to the strict quality required to ensure proper reactivity, which reduces the economical attractiveness. The current invention resolves this issue by recycling the CaO, originally coming from the LPG itself.

As described above, limitation on the conventional process comes from acid availability and lime or LS availability, which this invention overcomes by including the recycled SA and lime from phosphogypsum. The present invention integrates phosphogypsum calcination in block E to recover SA in a $SO_2$-gas-based sulfuric acid recovery plant (block F), with byproduct L (CaO).

Described herein is the calcination reaction:

$$4CaSO_4 \cdot 2H_2O+CH_4+Heat=4CaO+4SO_2+CO_2+10H_2O \text{ (temp. range 1200-1500° C.)} \quad (xvi)$$

HGP has "m and z" values of <1.0 and "x and y" values of <0.5, compared to LGP's high starting values. HGP also is mainly constituted of DCP which has a $CaO/P_2O_5$ molar ratio of 1.0. Compared to the concentrate phosphate rock (CPR) which has $CaO/P_2O_5$ molar ratio >4.0.

HGP can be exported as final product which more competitive compare to conventional export grade CPR with $P_2O_5$ concentrations of 26-34%. HGP, as shown in block H, can directly be utilized to produce merchant grade phosphoric acid (MGA) with only 20-30% of the phosphogypsum amount and less than 30% of SA consumption per ton of $P_2O_5$ compared to conventional PAP using CPR.

As used herein, the term "impurities" relates to undesired material or mineral as component in phosphate ore. The undesired material is also named waste. Impurities may comprise for example carbonates (e.g. calcite, dolomite), silicates, and/or clays. Impurities can also comprise silicate minerals such as quartz, feldspar or syenite minerals, layered silicates (micas, clays) or organic materials. The typical composition of phosphates preferably comprises different subtypes of apatite structure, such as for example fluoroapatite, hydroxoapatite, carbonatoapatite, chloroapatite or their combinations, also known as frankolyte.

As used herein, the term "phosphogypsum" is defined to mean is a by-product from the production of phosphoric acid by treating phosphate ore with sulfuric acid and producing gypsum ($CaSO_4 \cdot 2H_2O$) and aqueous phosphoric acid according to the following reaction: $Ca_5(PO_4)_3[F, OH, Cl, Br]_{(s)} + 5H_2SO_{4(aq)} + 2H_2O_{(l)} \rightarrow 3H_3PO_{4(aq)} + 5CaSO_4 \cdot 2H_2O(s) + [HF, H_2O, HCl, Br]_{(aq)}$.

As used herein, the term "low-grade phosphate" is defined to mean phosphate rock containing less than 20% $P_2O_5$ and the term "high-grade phosphate" to mean phosphate rock containing a total amount of equal or more than 45% $P_2O_5$.

As used herein, the term Merchant Grade; Acid is defined to mean phosphoric acid that is typically 52 to 54% by weight of $P_2O_5$, and containing less than 1% solids content.

As used herein, the term "recovery" refers to the percentage of valuable material recovered after the enrichment via beneficiation and via processing in phosphoric acid plant to recover valuable $P_2O_5$ to MGA form. The relationship of grade (concentration) vs. recovery (amount) is a measure for the total beneficiation and phosphate processing from ROM to MGA.

PROPHETIC EXAMPLES

Most of the technology identified and utilized by the new integrated process in this invention are well proven and have been demonstrated commercially. With this invention the integration allows significant scale-up by more than 500%, through over-coming the practical limitation of each of those technologies in isolation.

The following reference case is given to demonstrate the processing of existing phosphate reserves in the conventional method and compare that to the current invention's value proposition;

Starting with the $P_2O_5$ loss in the mining to avoid high impurities like in this case MgO;

| Phosphate Zones Cut | $P_2O_5$ recovery % | $P_2O_5$ % | CaO % | MgO % | Reserve (Mt) |
|---|---|---|---|---|---|
| Total Phosphate Zone (TPZ) | 100% | 17.71% | 50.23% | 6.51% | 619 |
| Concentrated Phosphate Zone (CPZ) | 46.9% | 20.1% | 48.59% | 3.2% | 256 |

It is shown that 53.1% of the $P_2O_5$ is lost due to the mining of the CPZ only, as the beneficiation process could not reach the target CPR grade of 30% $P_2O_5$ and <1.0% MgO with lower grade cut like that in the TPZ.

The integrated process allows the processing of the TPZ with no regard to MgO contamination levels.

Beneficiation process of CPZ which include crushing and grinding (block A), then hydro-sizing and flotation, which produces the following results;

| Feed/Product | $P_2O_5$ recovery % | $P_2O_5$ % | CaO % | MgO % | Production (Mtpy) |
|---|---|---|---|---|---|
| Concentrated Phosphate Zone (CPZ) | 46.9% | 20.1% | 48.59% | 3.2% | 13.0 |
| Concentrated Phosphate Rock (CPR) | 30.5% | 30.3% | 48.0% | 0.89% | 5.6 |

Loss of additional 35% of CPZ $P_2O_5$ is realized in the conventional beneficiation stage, to produce CPR with the minimum required specifications for PAP processing. It will required 13.0 Mtpy of CPZ, where "Mtpy" is defined as Million ton per year.

By comparison, the current invention's integrated process: (1) only needs to crush and grind 10.0 Mtpy of TPZ (block A), compare with 13.0 Mtpy of conventional beneficiation; (2) the ground TPZ is then digested in diluted HCl solution in block B to produce dissolved salts of; $Ca(H_2PO_4)_2$, $CaCl_2$ and $MgCl_2$, while insoluble material like; $SiO_2$ and $CaF_2$ and $CaSO_4$ is separated in block B, with 5-15% $P_2O_5$ losses, and normally 10%; (3) lime or limestone is added to precipitate and separate 3.39 Mtpy DCP in block D, leaving $CaCl_2$ and $MgCl_2$ in solution which is further treated in block D with lime to precipitate and separate $Mg(OH)_2$ and/or $MgPO_4$; (4) $CaCl_2$ solution is treated with 7.3 Mtpy concentrated SA from block F and 12.87 Mtpy of phosphogypsum is precipitated and separated in block C. Diluted HCl solution is then recycled to block B again.

The net outcome of the TPZ processing is summarized in the following table;

| Feed/Product | $P_2O_5$ recovery % | $P_2O_5$ % | CaO % | MgO % | Production Mtpy |
|---|---|---|---|---|---|
| Concentrated Phosphate Zone (TPZ) | 100% | 17.71% | 50.23% | 6.51% | 10.0 |
| High Grade Phosphate (HGP) | 90% | 45.0% | 48.0% | 0.1% | 3.39 |

The transportation of 5.6 Mtpy of CPR is more expensive compare to 3.36 Mtpy of HGP. CPR is then processed in PAP plant with the following outcomes:

| Feed/Product | $P_2O_5$ recovery % | $P_2O_5$ % | CaO % | MgO % | Production Mtpy |
|---|---|---|---|---|---|
| Concentrated Phosphate Rock (CPR) | 30.5% | 30.3% | 48.0% | 0.89% | 5.6 |
| Sulfuric Acid consumed | | | | | 5.0 |
| Merchant Grade Phosphoric Acid produced (MGA) | 26.2% | 54.0% | | 1.2% | 2.9 |
| Phosphogypsum produced (PG) | 4.3% | 2.5% | 25% | | 9.0 |

With conventional processing, net MGA production will represent 26.2% of the total potential $P_2O_5$, in the mine (TPZ). By comparison, the current invention's integrated process concept, will process HGP in the PAP, block H:

| Feed/Product | $P_2O_5$ recovery % | $P_2O_5$ % | CaO % | MgO % | Production Mtpy |
|---|---|---|---|---|---|
| High Grade Phosphate (HGP) | 90% | 45.0% | 48.0% | 0.89% | 3.39 |
| Sulfuric Acid consumed | | | | | 1.04 |
| Merchant Grade Phosphoric Acid produced (MGA) | 85.5% | 54.0% | | 0.12% | 2.9 |
| Phosphogypsum produced (PG) | 4.3% | 2.5% | 25% | | 2.63 |

With HGP, net MGA production will represent 85.5% of the total potential $P_2O_5$, in the mine (TPZ). Nearly 60% higher recovery than conventional processing route above.

All phosphogypsum produced (15.5 Mtpy) are calcined in block E to produce lime and $SO_2$, and then 7.3 Mtpy SA are produced from $SO_2$ in block F, which is then recycled to the block C or block B and block H.

3.1 Mtpy of $CO_2$ from block B and block F are captured in with L in block G to produce 7.1 Mtpy of clean LS, suitable for multiple applications.

REFERENCES

[1] Decomposition of Calcium Sulfate: A Review of Literature. W. M. Swift, A. F. Panek, G. W. Smith, G. J. Vogel and A. A. Jonke, Chemical Engineering Division, Argonne National Laboratory, Illinois, USA

[2] Effect of Temperature on the Carbonation Reaction of CaO with $CO_2$. Zhen-shan Li, Fan Fang, Xiao-yu Tang, and Ning-sheng Cai, ACS publication, dx.doi.org/10.1021/ef201543n, Energy Fuels 2012, 26, 2473-2482.

What is claimed is:

1. An integrated method for upgrading low-grade phosphate sources to high grade phosphate, wherein the method comprises the steps of:

(a) subjecting a low-grade calcareous source material to one or more operations selected from the group consisting of mixing, crushing, grinding, and conditioning to obtain low-grade calcareous phosphate ore;

(b) digesting the low-grade calcareous phosphate ore with an acidic solution, wherein the acidic solution comprises an acid selected from the group consisting of sulfuric acid and nitric acid or hydrochloric acid, and mixtures thereof, to obtain a solution comprising $Ca^{2+}$ and $H_2PO_4^{-1}$ ions, phosphogypsum, and precipitating and separating impurities, wherein the impurities include one or more of a silica, fluorides, magnesium, aluminum and iron;

(c) precipitating di-calcium phosphate from diluted solution of monocalcium phosphate by adding an alkalinizing agent comprising $Ca^{2+}$ at a temperature above approximately 80° C. during the reaction and precipitation to obtain anhydrous form of di-calcium phosphate, as well as precipitating and separating impurities, wherein the impurities include one or more of magnesium, aluminum, iron and heavy metals;

(d) calcinating the phosphogypsum at a temperature range of 1200-1700° C. with $CH_4$ to produce CaO, $SO_2$, and $CO_2$, according to reaction (v):

$$4CaSO_4{\cdot}2H_2O+CH_4+Heat=4CaO+4SO_2+CO_2+10H_2O; \quad (v)$$

(e) generating sulfuric acid in an $SO_2$ gas-based sulfuric acid recovery plant by integrating the phosphogypsum calcination described in (d), by feeding the $SO_2$ generated in step (d) to step (e), as described in reaction (vi):

$$4SO_2+2O_2+4H_2O{=\!=}4H_2SO_4; \text{ and} \quad (vi)$$

(f) reacting CO2 produced in reactions described in (b) and (d) with CaO produced in reaction (d) according to the following reaction (vii):

$$CO_2+CaO=CaCO_3 \quad (vii).$$

2. The integrated method of claim 1, wherein the concentration of $P_2O_5$ in the solution generated from digesting the low-grade calcareous phosphate ore is in a range of approximately 2-10% by weight.

3. The integrated method of claim 2, where the concentration of $P_2O_5$ in the solution generated from digesting the low-grade calcareous phosphate ore is approximately 6% in solution by weight.

4. The integrated method of claim 1, wherein the heavy metal is selected from the group consisting of cadmium, arsenic, lead, and combinations thereof.

5. The integrated method of claim 4, wherein the production percentage yield of anhydrous di-calcium phosphate achieves $P_2O_5$ levels above approximately 42% by weight.

6. The integrated method of claim 5, wherein the production percentage yield of anhydrous di-calcium phosphate achieves waste having $P_2O_5$ below approximately the range of 10 to 20%.

7. The integrated method of claim 1, further comprising:

(g) capturing $CO_2$ produced in (b) and (d) and reacting the $CO_2$ with CaO to produce $CaCO_3$ at a temperature range of 200-600° C.

8. The integrated method of claim 7, wherein:

(1) the concentration of $P_2O_5$ in the solution is in a range of 2-10% by weight;

(2) di-calcium phosphate is precipitated from diluted monocalcium phosphate at a temperature above approximately 80° C. to obtain anhydrous di-calcium phosphate;

(3) the production percentage yield of anhydrous di-calcium phosphate achieves a phosphate concentration level above approximately 42% by weight;

(4) the production percentage yield of anhydrous di-calcium phosphate achieves waste having a phosphate concentration below approximately 20% by weight;

(5) the alkalinizing agent comprising $Ca^{2+}$ is selected from the group consisting of a CaO and CaCO3 from a source comprising lime or limestone; and (6) the phosphogypsum from other reactions is calcinated at a temperature range of 1200-1500° C.

9. The integrated method of claim 8, wherein the concentration of $P_2O_5$ in the solution is in a range of 2-10% by weight.

10. An integrated method to chemically process low-grade calcareous phosphate ore or phosphate waste from existing beneficiation operation, wherein the method comprises the steps of:

(h) digesting low-grade calcareous phosphate ore with an acidic solution, wherein the acidic solution comprises an acid selected from the group consisting of sulfuric acid and nitric acid or hydrochloric acid, and mixtures of the sulfuric acid with either nitric acid or HCl in diluted conditions, to separate impurities, wherein the impurities comprise one or more of:

(1) calcium in the form of calcium sulfate, calcium nitrate or calcium chloride;

(2) magnesium/aluminum/iron in the form of phosphates of hydroxides; and (3) fluorides in the form of calcium fluoride;

(i) isolating $P_2O_5$ in the form of fertilizer-grade di-calcium phosphate by precipitation; and (j) calcinating phosphogypsum to produce lime and sulfur dioxide; and (k) utilizing the sulfur dioxide produced in step (j) to produce sulfuric acid, wherein the sulfur dioxide and sulfuric acid recovered from steps (j) and (k) for the production of di-calcium phosphate, requiring a minimum makeup of sulfur in the range of approximately 10-30% by weight.

11. The integrated method of claim 10, wherein the fertilizer-grade di-calcium phosphate has a $P_2O_5$ concentration above approximately 42% by weight.

12. The integrated method of claim 10, further comprising the steps of:

(l) producing limestone from the reaction of $CO_2$ and lime produced from the calcination of phosphogypsum;

(m) recovering heat from the reaction of step (l); and (n) capturing $CO_2$ from fuel and the digested limestone in the ore, to achieve $CO_2$ emission neutrality.

13. The integrated method of claim 12, further comprising:

(o) recycling a chemical product selected from the group consisting of lime and limestone to produce di-calcium phosphate and to separate impurities during the neutralization reactions of the diluted acidic digestion solution.

14. An integrated method to chemically process low-grade calcareous phosphate ore or phosphate waste from the method of claim 1, wherein the temperature range of the reaction (vii) is approximately 200 to 600° C.

* * * * *